United States Patent
Park et al.

(10) Patent No.: US 6,714,496 B2
(45) Date of Patent: Mar. 30, 2004

(54) METHOD FOR CALIBRATING TILT IN DISC PLAYER

(75) Inventors: Hong S. Park, Suwon-si (KR); Jong W. Kim, Suwon-si (KR); Myoung J. Go, Suwon-si (KR)

(73) Assignee: Digital Multimedia Technology Co., Ltd., Kyunggi-Do (KR)

( * ) Notice: Subject to any disclaimer, the term of this patent is extended or adjusted under 35 U.S.C. 154(b) by 379 days.

(21) Appl. No.: 09/967,661

(22) Filed: Oct. 1, 2001

(65) Prior Publication Data

US 2002/0093896 A1 Jul. 18, 2002

(30) Foreign Application Priority Data

Jan. 15, 2001 (KR) .................. 10-2001-0002103

(51) Int. Cl.[7] .................................................. G11B 3/90
(52) U.S. Cl. .................. 369/53.19; 369/347.36
(58) Field of Search .......................... 369/44.25, 44.27, 369/44.29, 44.32, 47.36, 47.38, 47.45, 53.19, 53.28, 53.42, 53.43, 53.31

(56) References Cited

U.S. PATENT DOCUMENTS

| | | | | |
|---|---|---|---|---|
| 6,388,982 B2 | * | 5/2002 | Ogusu | 369/264 |
| 6,430,130 B1 | * | 8/2002 | Furukawa | 369/53.19 |
| 6,493,296 B1 | * | 12/2002 | Fukumoto et al. | 369/44.32 |
| 6,614,748 B2 | * | 9/2003 | Shiomi et al. | 369/270 |
| 6,633,532 B1 | * | 10/2003 | Handa | 369/263 |

FOREIGN PATENT DOCUMENTS

KR 20010002103 1/2001

* cited by examiner

*Primary Examiner*—Paul W. Huber
(74) *Attorney, Agent, or Firm*—Park & Sutton LLP; John K. Park

(57) ABSTRACT

A method for calibrating a tilt in a disc player includes a disc insertion judgment step, a focus error output time judgment step, a subtraction step, a disc recording surface judgment step, and a tilt calibration step. In the focus error output time judgment step, an optical pickup unit is made to ascend and then descend for a predetermined time, to then judge a first focus error output time at which a focus error is output during ascending and a second focus error output time at which a focus error is output during descending. A focus error output difference time is obtained by subtracting the FET1 from the FET2. In the tilt calibration step, if the FET is not same as a reference focus error output difference time (FETrf), the turntable is made to rotate, to calibrate a tilt between the optical pickup unit and the disc.

14 Claims, 6 Drawing Sheets

METHOD FOR CALIBRATING TILT IN DISC PLAYER

CLAIMING FOREIGN PRIORITY

The applicant claims and requests a foreign priority, through the Paris Convention for the Protection of Industry Property, based on a patent application filed in the Republic of Korea (South Korea) with the filing date of Jan. 15, 2001, with the patent application number 2001-0002103, by the applicant. (See the Attached Declaration)

BACKGROUND OF THE INVENTION

1. Field of the Invention

The present invention relates to a tilt calibration method for use in a disc player, and more particularly, to a method for calibrating a tilt in a disc player in which a tilt in a disc player can be calibrated according to the crooked state of a recording surface on a disc which is loaded and rotated at high speed on a turntable.

2. Description of the Related Art

In a general disc player, a disc, for example, a compact disc or a digital videodisc is loaded on a turntable according to driving of a loading mechanism, and clamped by operation of a clamping unit. Information is recorded on a disc or reproduced from a disc, by driving of an optical pickup unit which reciprocates in the radial direction of the disc and irradiates beams onto recording pits on the disc.

A beam irradiated from an optical pickup unit should be irradiated accurately perpendicular to a recording pit on a disc in order to reproduce or record information from or on the disc. For this reason, the surface on a disc should be plane. However, a disc surface is bent in one direction or twisted in the process of manufacturing or distributing discs.

Thus, in the case that a disc surface is bent in one direction or has a surface of a twisted shape, a recording surface on a disc is crooked. As a result, a tilt occurs between the disc recording surface and the irradiated beam from the pickup unit according to the crooked state of the disc recording surface.

The tilt phenomenon causes an optical axis of the optical pickup unit to be slant with respect to the disc recording surface, and aberration to occur in a focusing beam, with a result that a frequency characteristic of light, in particular, a phase characteristic in this case is degenerated. Accordingly, a reproduction performance is remarkably lowered. Also, in particular, information is not reproduced from a disc of which the crooked state of the disc recording surface is severe.

A tilt calibration apparatus solving the above problems has been disclosed in Korean Utility Model Application No. 1999-22530, in which a guide rod for guiding an optical pickup unit in the radial direction of a disc is calibrated up and down to thereby calibrate a tilt.

By the way, in the case that a guide rod is calibrated up and down, an optical pickup unit moves askew so that a tilt is calibrated. However, since an overload occurs in a driving source of an optical pickup unit requiring a minute calibration according to a slant degree of a guide rod, a movable performance of an optical pickup unit is lowered, and thus a reproduction characteristic is influenced. Also, since a manual work is done to calibrate a tilt, a precise calibration is limited.

SUMMARY OF THE INVENTION

To solve the above problems, it is an object of the present invention to provide a tilt calibration method for use in a disc player in which the crooked states of the recording surface on a disc, and a turntable secured on a regulation plate, driven and rotated by a spindle motor and on which a disc is loaded, is made to rotate according to the crooked states of the recording surface on the disc, to thereby accurately optical beams irradiated from an optical pickup unit on the recording surface on the disc, and improve a reproduction feature.

To accomplish the above object of the present invention, there is provided a method for calibrating a tilt in a disc player, the tilt calibration method comprising: a disc insertion judgment step of judging whether or not a disc has been inserted onto a turntable; a focus error output time judgment step of judging a first focus error output time at which a focus error is output during ascending and a second focus error output time at which a focus error is output during descending, in which an optical pickup unit for irradiating beams onto a recording surface on the disc is made to ascend and then descend for a predetermined time, if a disc is inserted onto the turntable; a subtraction step of subtracting the first focus error output time from the second focus error output time, both of which have been judged in the focus error output time judgment step, and outputting a focus error output difference time; a disc recording surface judgment step of subtracting a reference focus error output difference time which is preset when the recording surface on the disc is normal from the focus error output difference time output from the subtraction step, and judging a crooked state of the recording surface on the disc; and a tilt calibration step of making the turntable rotate if the focus error output difference time is not same as the reference focus error output difference time, in the result of the disc recording surface judgment step, to thereby calibrate a tilt between the optical pickup unit and the disc.

BRIEF DESCRIPTION OF THE DRAWINGS

The above object and other advantages of the present invention will become more apparent by describing the preferred embodiments thereof in more detail with reference to the accompanying drawings in which.

DETAILED DESCRIPTION OF THE INVENTION

Preferred embodiments of the present invention will be described with reference to the accompanying drawings.

Figure 1:
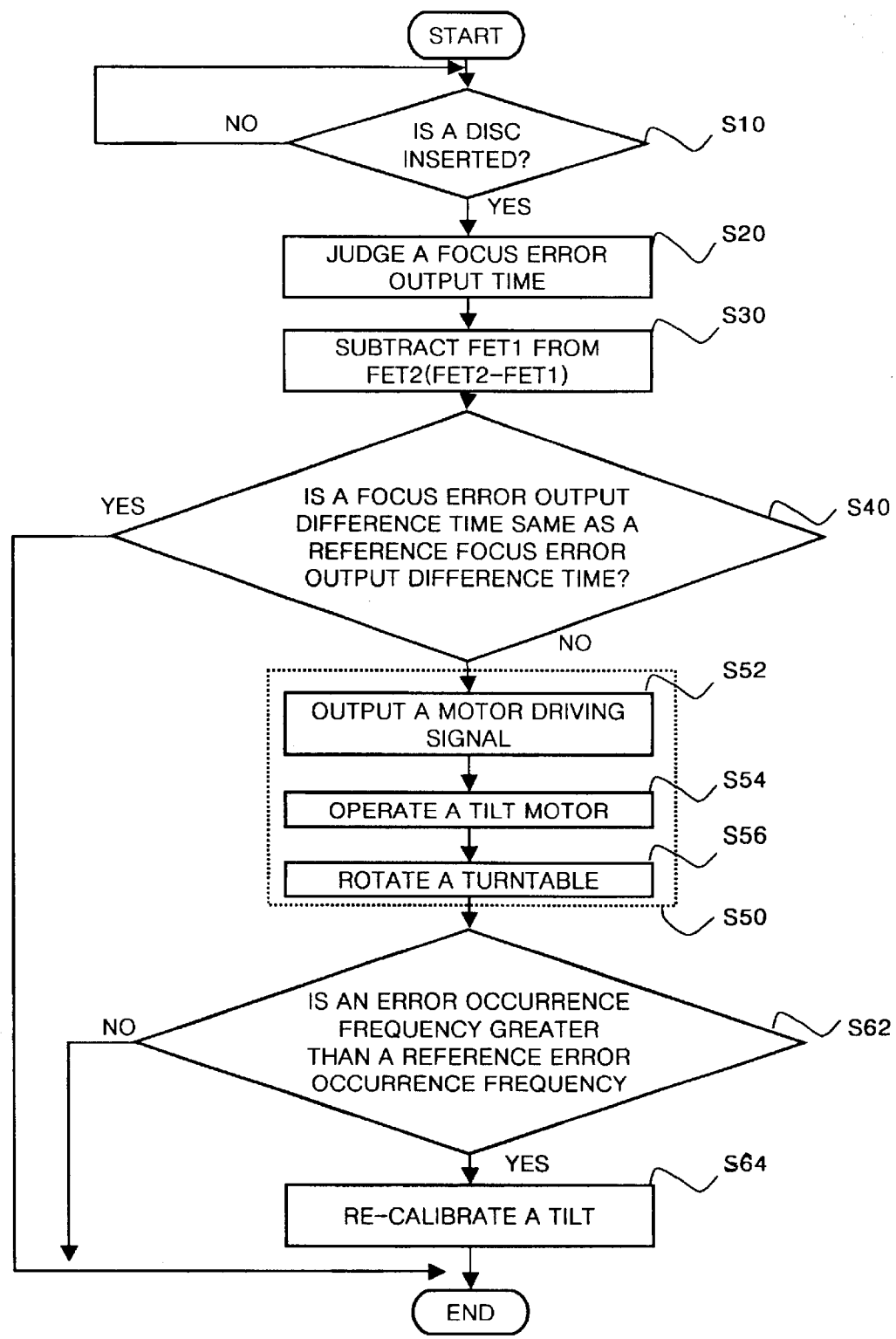
FIG. 1 is a flowchart view illustrating a tilt calibration method for use in a disc player according to a first embodiment of the present invention.

Referring to FIG. 1, a tilt calibration method for use in a disc player according to a first embodiment of the present invention, includes a disc insertion judgment step S10, a focus error output time judgment step S20, a subtraction step S30, a disc recording surface judgment step S40, and a tilt calibration step S50.

The disc insertion judgment step S10 judges whether or not a disc 1 has been inserted onto a turntable 10. The focus error output time judgment step S20 judges a first focus error output time FET1 at which a focus error is output during ascending and a second focus error output time FET2 at which a focus error is output during descending, in which an optical pickup unit 20 for irradiating beams onto a recording surface on the disc 1 is made to ascend and then descend for a predetermined time, if a disc 1 is inserted onto the turntable 10 in the disc insertion judgment step S10. The subtraction step S30 subtracts the first focus error output time FET1 from the second focus error output time FET2, both of which have been judged in the focus error output time judgment step S20, and outputs a focus error output difference time FET. The disc recording surface judgment step S40 subtracts a reference focus error output difference time FETrf which is preset when the recording surface on the disc is normal from the focus error output difference time FET output from the subtraction step S30, and judges a crooked state of the recording surface on the disc 1. The tilt calibration step S50 makes the turntable 10 rotate if the focus error output difference time FET is not same as the reference focus error output difference time FETrf, in the result of the disc recording surface judgment step S40, to thereby calibrate a tilt between the optical pickup unit 20 and the disc 1.

If the focus error output difference time FET is not same as the reference focus error output difference time FETrf, in the result of the disc recording surface judgment step S40, the tilt calibration step S50 includes a motor driving signal output step S52, a tilt motor operation step S54, and a turntable rotation step S56. The motor driving signal output step S52 outputs a motor driving signal MD. The tilt motor operation step S54 rotates a tilt motor 40 forwardly or reversely by the motor driving signal MD output from the motor driving signal output step S52. In the turntable rotation step S56, an edge 81 of a regulation plate 80 integrally formed with a spindle motor 70 which rotates the turntable 10 slidingly contacts a spiral slant cam 60, and thus the spiral slant cam 60 installed on the same axis as that of a cam gear 50 is rotated by the cam gear 50 driven by rotation of the tilt motor 40 in the tilt motor operation step S54, and the regulation plate 80 ascends and descends according to rotation of the spiral slant cam 60, to thereby rotate the turntable 10.

Referring to FIG. 1, the tilt calibration method in a disc player according to the first embodiment of the present invention further includes a comparison step S62 and a tilt re-calibration step S64. The comparison step S62 counts an error occurrence frequency of reproduction information read from the recording surface on the disc 1 by an error correction signal output from a digital signal processor (not shown) and compares the error occurrence frequency with a preset reference error occurrence frequency. If an error occurrence frequency is greater than the preset reference error occurrence frequency in the comparison step S62, the tilt re-calibration step S64 rotates the turntable 10 in the direction opposing the direction to which the turntable 10 was rotated in the tilt calibration step S50 so that an error correction signal does not occur in the digital signal processor, to thereby re-calibrate a tilt between the optical pickup unit 20 and the disc 1.

Figure 2:
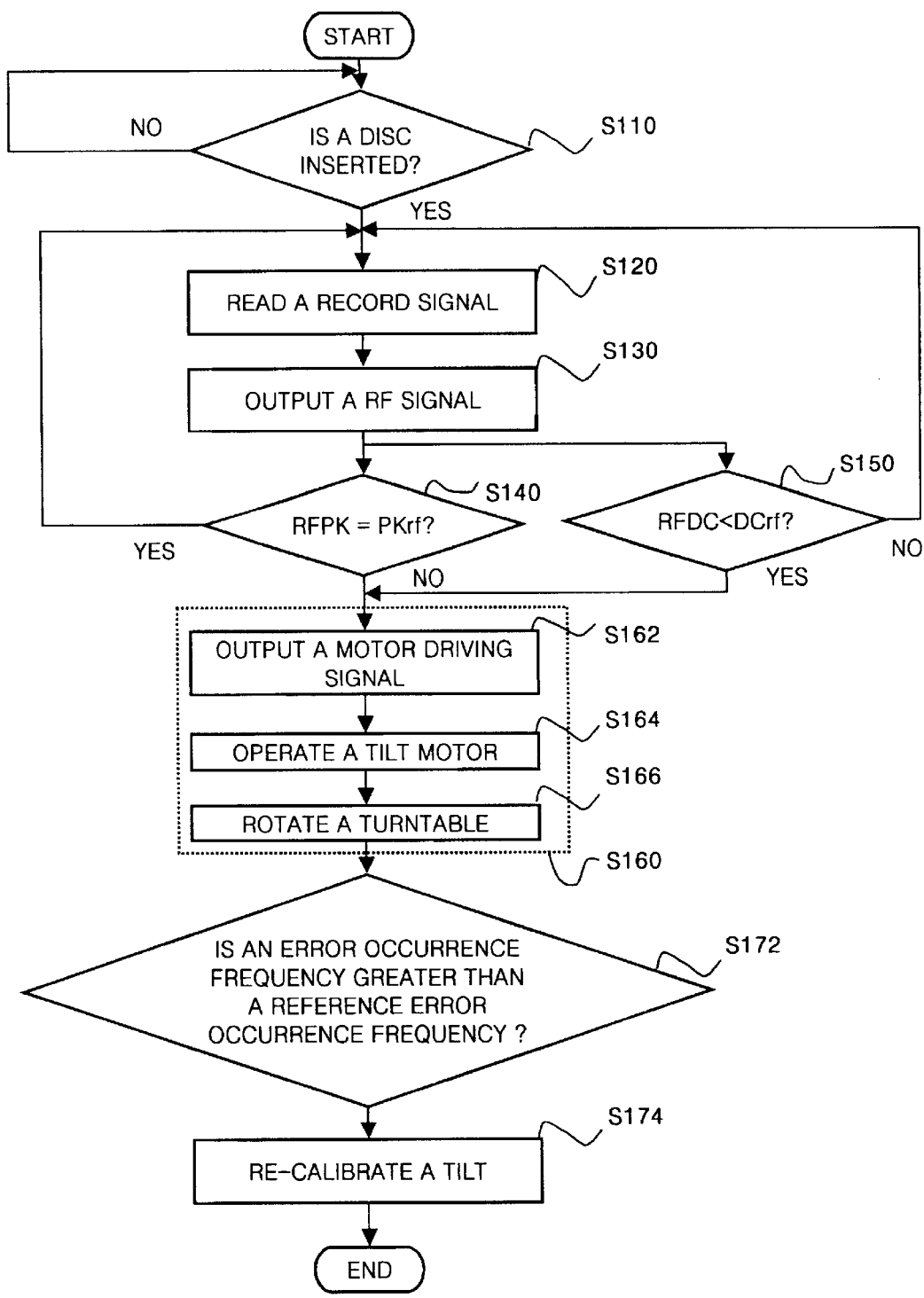
FIG. 2 is a flowchart view illustrating a tilt calibration method for use in a disc player according to a second embodiment of the present invention.

FIG. 2 is a flowchart view illustrating a tilt calibration method for use in a disc player according to a second embodiment of the present invention.

Referring to FIG. 2, a tilt calibration method for use in a disc player according to a second embodiment of the present invention, includes a disc insertion judgment step S110, a record signal reading step S120, a RF signal output step S130, a peak voltage comparison step S140, and a tilt calibration step S160.

The disc insertion judgment step S110 judges whether or not a disc 1 has been inserted onto a turntable 10. The record signal reading step S120 reads a record signal in which an optical pickup unit 20 irradiates beams onto a recording surface on the disc 1, if a disc 1 is inserted onto the turntable 10 in the disc insertion judgment step S110. The RF signal output step S130 receives a record signal read by the optical pickup unit 20 in the record signal reading step S120, and outputs a RF signal filtered and shaped from the received record signal. The peak voltage comparison step S140 receives a RF signal and compares a peak voltage RFPK of the received RF signal with a preset reference peak voltage PKrf. The tilt calibration step S160 makes the turntable 10 rotate if the RF signal peak voltage RFPK is not same as the preset reference peak voltage PKrf, in the result of the peak voltage comparison step S140, to thereby calibrate a tilt between the optical pickup unit 20 and the disc 1.

If the RF signal peak voltage RFPK is not same as the preset reference peak voltage PKrf, in the result of the peak voltage comparison step S140, the tilt calibration step S160 includes a motor driving signal output step S162, a tilt motor operation step S164, and a turntable rotation step S166. The motor driving signal output step S162 outputs a motor driving signal MD. The tilt motor operation step S164 rotates a tilt motor 40 forwardly or reversely by the motor driving signal MD output from the motor driving signal output step S162. In the turntable rotation step S166, an edge 81 of a regulation plate 80 integrally formed with a spindle motor 70 which rotates the turntable 10 slidingly contacts a spiral slant cam 60, and thus the spiral slant cam 60 installed on the same axis as that of a cam gear 50 is rotated by the cam gear 50 driven by rotation of the tilt motor 40 in the tilt motor operation step S164, and the regulation plate 80 ascends and descends according to rotation of the spiral slant cam 60, to thereby rotate the turntable 10.

Referring to FIG. 2, the tilt calibration method in a disc player according to the second embodiment of the present invention further includes a direct-current (DC) voltage comparison step S150 for receiving the RF signal and comparing an average DC voltage RFDC of the received RF signal with a preset reference average DC voltage DCrf, in which the turntable 10 is made to rotate to thereby calibrate a tilt between the optical pickup unit 20 and the disc 1, if the RF signal peak voltage RFPK is not same as that of the preset reference peak voltage PKrf in the tilt calibration step S160, or the RF signal average DC voltage RFDC is smaller than the reference average DC voltage DCrf in the DC voltage comparison step S150.

In the same manner as that of the FIG. 1 embodiment, referring to FIG. 2, the tilt calibration method in a disc player according to the second embodiment of the present invention further includes a comparison step S172 and a tilt re-calibration step S174. The comparison step S172 counts an error occurrence frequency of reproduction information read from the recording surface on the disc 1 by an error correction signal output from a digital signal processor (not shown) and compares the error occurrence frequency with a preset reference error occurrence frequency. If an error occurrence frequency is greater than the preset reference error occurrence frequency in the comparison step S172, the tilt re-calibration step S174 rotates the turntable 10 in the direction opposing the direction to which the turntable 10 was rotated in the tilt calibration step S160 so that an error correction signal does not occur in the digital signal processor, to thereby re-calibrate a tilt between the optical pickup unit 20 and the disc 1.

Figure 3:
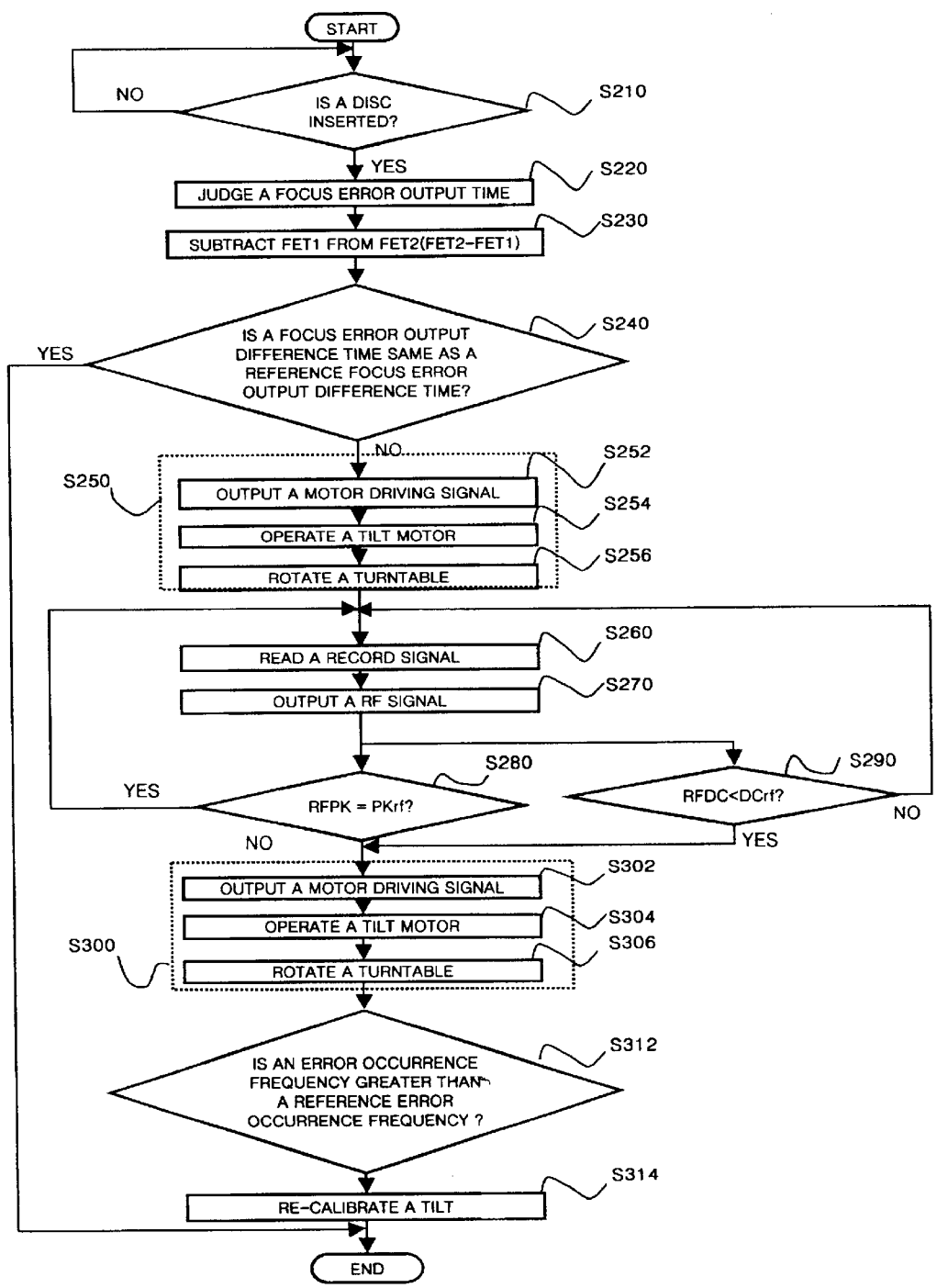
FIG. 3 is a flowchart view illustrating a tilt calibration method for use in a disc player according to a third embodiment of the present invention.

FIG. 3 is a flowchart view illustrating a tilt calibration method for use in a disc player according to a third embodiment of the present invention.

Referring to FIG. 3, a tilt calibration method for use in a disc player according to a third embodiment of the present invention, includes a disc insertion judgment step S210, a focus error output time judgment step S220, a subtraction step S230, a disc recording surface judgment step S240, a first tilt calibration step S250, a record signal reading step S260, a RF signal output step S270, a peak voltage comparison step S280, and a second tilt calibration step S300.

The disc insertion judgment step S210 judges whether or not a disc 1 has been inserted onto a turntable 10. The focus error output time judgment step S220 judges a first focus error output time FET1 at which a focus error is output during ascending and a second focus error output time FET2 at which a focus error is output during descending, in which an optical pickup unit 20 for irradiating beams onto a recording surface on the disc 1 is made to ascend and then descend for a predetermined time, if a disc 1 is inserted onto the turntable 10 in the disc insertion judgment step S210. The subtraction step S230 subtracts the first focus error output time FET1 from the second focus error output time FET2, both of which have been judged in the focus error output time judgment step S220, and outputs a focus error output difference time FET. The disc recording surface judgment step S240 subtracts a reference focus error output difference time FETrf which is preset when the recording surface on the disc is normal from the focus error output difference time FET output from the subtraction step S230, and judges a crooked state of the recording surface on the disc 1. The first tilt calibration step S250 makes the turntable 10 rotate if the focus error output difference time FET is not same as the reference focus error output difference time FETrf, in the result of the disc recording surface judgment step S240, to thereby calibrate a tilt between the optical pickup unit 20 and the disc 1 so that the focus error output difference time FET is same as the reference focus error output difference time FETrf.

The record signal reading step S260 reads a record signal in which an optical pickup unit 20 irradiates beams onto a recording surface on the disc 1, after the first tilt calibration step S250. The RF signal output step S270 receives a record signal read by the optical pickup unit 20 in the record signal reading step S260, and outputs a RF signal filtered and shaped from the received record signal. The peak voltage comparison step S280 receives a RF signal and compares a peak voltage RFPK of the received RF signal with a preset reference peak voltage PKrf. The second tilt calibration step S300 makes the turntable 10 rotate if the RF signal peak voltage RFPK is not same as the preset reference peak voltage PKrf, in the result of the peak voltage comparison step S280, to thereby calibrate a tilt between the optical pickup unit 20 and the disc 1 so that the RF signal peak voltage RFPK is same as the preset reference peak voltage PKrf.

If the focus error output difference time FET is not same as the reference focus error output difference time FETrf, in the result of the disc recording surface judgment step S240, the first tilt calibration step S250 includes a motor driving signal output step S252, a tilt motor operation step S254, and a turntable rotation step S256. The motor driving signal output step S252 outputs a motor driving signal MD. The tilt motor operation step S254 rotates a tilt motor 40 forwardly or reversely by the motor driving signal MD output from the motor driving signal output step S252. In the turntable rotation step S256, an edge 81 of a regulation plate 80 integrally formed with a spindle motor 70 which rotates the turntable 10 slidingly contacts a spiral slant cam 60, and thus the spiral slant cam 60 installed on the same axis as that of a cam gear 50 is rotated by the cam gear 50 driven by rotation of the tilt motor 40 in the tilt motor operation step S254, and the regulation plate 80 ascends and descends according to rotation of the spiral slant cam 60, to thereby rotate the turntable 10.

If the RF signal peak voltage RFPK is not same as the preset reference peak voltage PKrf, in the result of the peak voltage comparison step S280, the second tilt calibration step S300 includes a motor driving signal output step S302, a tilt motor operation step S304, and a turntable rotation step S306. The motor driving signal output step S302 outputs a motor driving signal MD. The tilt motor operation step S304 rotates a tilt motor 40 forwardly or reversely by the motor driving signal MD output from the motor driving signal output step S302. In the turntable rotation step S306, an edge 81 of a regulation plate 80 integrally formed with a spindle motor 70 which rotates the turntable 10 slidingly contacts a spiral slant cam 60, and thus the spiral slant cam 60 installed on the same axis as that of a cam gear 50 is rotated by the cam gear 50 driven by rotation of the tilt motor 40 in the tilt motor operation step S304, and the regulation plate 80 ascends and descends according to rotation of the spiral slant cam 60, to thereby rotate the turntable 10.

Referring to FIG. 3, the tilt calibration method in a disc player according to the third embodiment of the present invention further includes a direct-current (DC) voltage comparison step S290 for receiving the RF signal and comparing an average DC voltage RFDC of the received RF signal with a preset reference average DC voltage DCrf, in which the turntable 10 is made to rotate to thereby calibrate a tilt between the optical pickup unit 20 and the disc 1, if the RF signal peak voltage RFPK is not same as that of the preset reference peak voltage PKrf in the second tilt calibration step S300, or the RF signal average DC voltage RFDC is smaller than the reference average DC voltage DCrf in the DC voltage comparison step S290.

In the same manner as that of the FIG. 1 embodiment, referring to FIG. 3, the tilt calibration method in a disc player according to the third embodiment of the present invention further includes a comparison step S312 and a tilt re-calibration step S314. The comparison step S312 counts an error occurrence frequency of reproduction information read from the recording surface on the disc 1 by an error correction signal output from a digital signal processor (not shown) and compares the error occurrence frequency with a preset reference error occurrence frequency. If an error occurrence frequency is greater than the preset reference error occurrence frequency in the comparison step S312, the tilt re-calibration step S314 rotates the turntable 10 in the direction opposing the direction to which the turntable 10 was rotated in the second tilt calibration step S300 so that an error correction signal does not occur in the digital signal processor, to thereby re-calibrate a tilt between the optical pickup unit 20 and the disc 1.

The operations of the disc player tilt calibration methods according to the present invention having the above-described configuration will be described below.

Figure 4A:
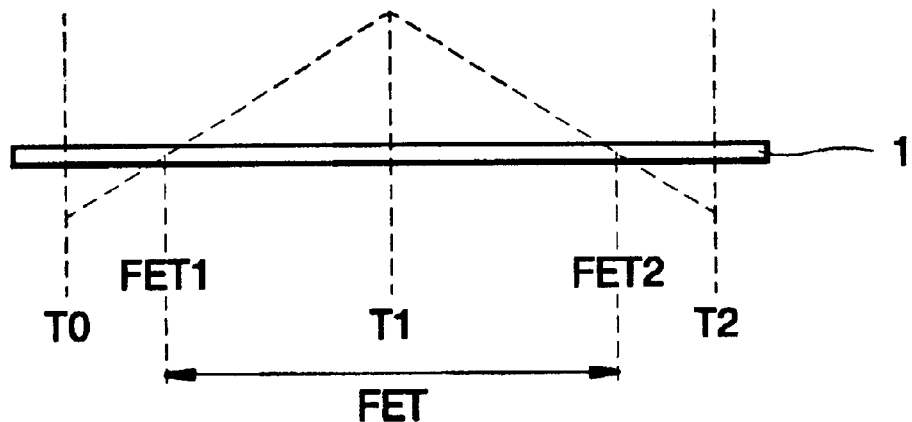
FIGS. 4A through 4C are views for explaining operations in a focus error output time judgment step of FIGS. 1 and 3.
Figure 4B:
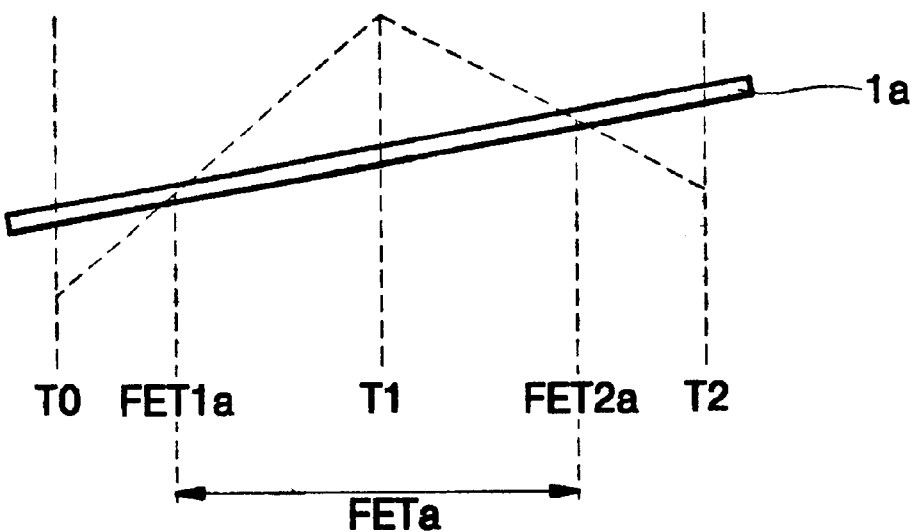

Referring to FIG. 1, the operation of a tilt calibration method for use in a disc player according to a first embodiment of the present invention will follow. The disc insertion judgment step S10 judges whether or not a disc 1 has been inserted onto a turntable 10. The focus error output time judgment step S20 judges a first focus error output time FET1 at which a focus error is output during ascending and a second focus error output time FET2 at which a focus error is output during descending, in which an optical pickup unit 20 for irradiating beams onto a recording surface on the disc 1 is made to ascend and then descend for a predetermined time, if a disc 1 is inserted onto the turntable 10 in the disc insertion judgment step S10. The subtraction step S30 subtracts the first focus error output time FET1 from the second focus error output time FET2, both of which have been judged in the focus error output time judgment step S20, and outputs a focus error output difference time FET. The disc recording surface judgment step S40 subtracts a reference focus error output difference time FETrf which is preset when the recording surface on the disc is normal from the focus error output difference time FET output from the subtraction step S30, and judges a crooked state of the recording surface on the disc 1. That is, as shown in FIG. 4A, in the case that a disc 1 loaded onto the turntable 10 is normal, the focus error output difference time FET obtained by subtracting the first focus error output time FET1 from the second focus error output time FET2 in the subtraction step S30 is same as the preset reference focus error output difference time RFFET. Also, as shown in FIG. 4B, in the case that a disc 1a loaded onto the turntable 10 is bent upwards in comparison with the normal disc 1, the focus error output difference time FETa obtained by subtracting the first focus error output time FET1a from the second focus error output time FET2a in the subtraction step S30 is smaller than the preset reference focus error output difference time RFFET. Also, as shown in FIG. 4C, in the case that a disc 1b loaded onto the turntable 10 is bent downwards in comparison with the normal disc 1, the focus error output difference time FETb obtained by subtracting the first focus error output time FET1b from the second focus error output time FET2b in the subtraction step S30 is greater than the preset reference focus error output difference time RFFET.

Figure 4C:
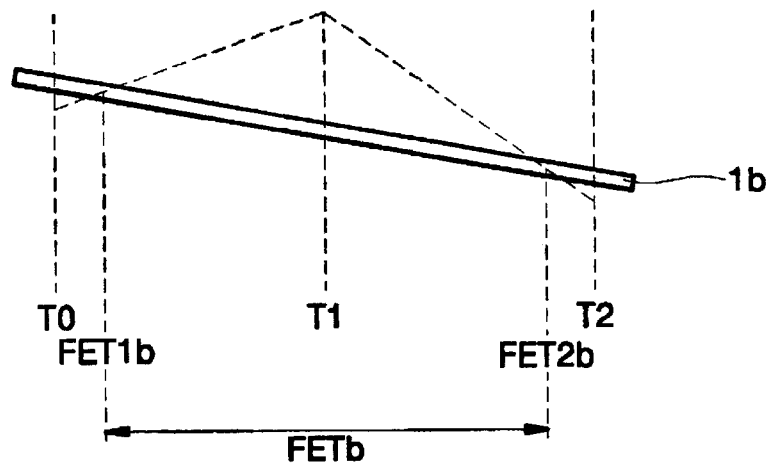
Figure 6A:
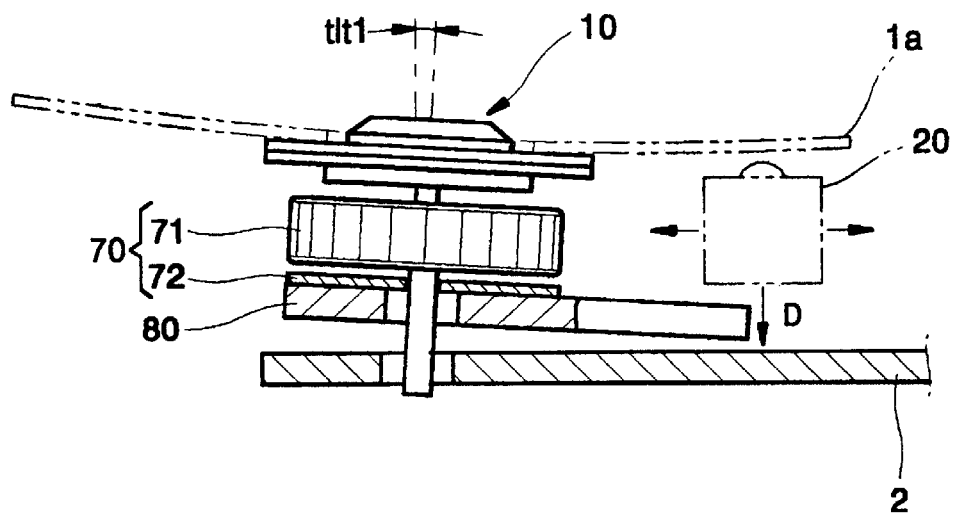
FIGS. 6A and 6B schematically illustrate tilt calibration states of a disc.
Figure 6B:
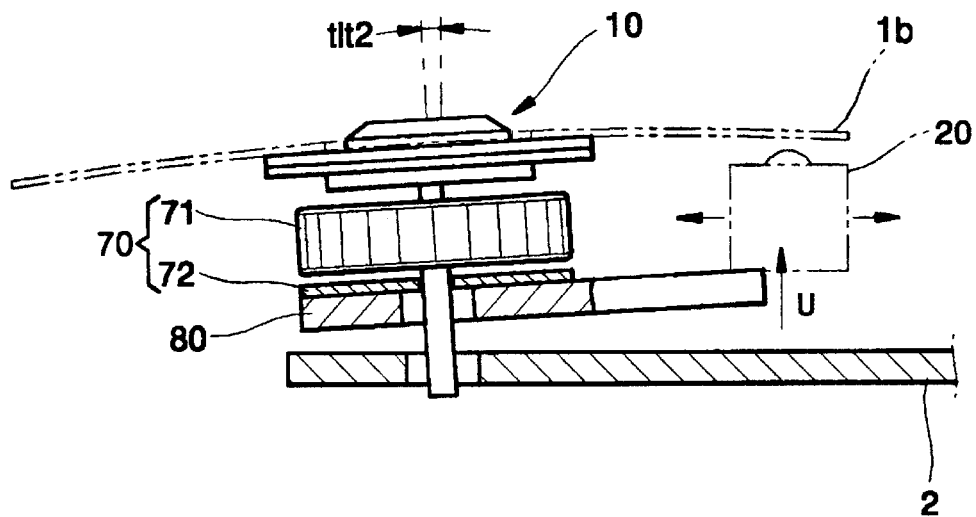

The tilt calibration step S50 makes the turntable 10 rotate upwards or downwards as shown in FIGS. 6A and 6B, if the focus error output difference time FET is not same as the reference focus error output difference time FETrf, that is, in the case that a disc loaded onto the turntable 10 is bent upwards or downwards as shown in FIGS. 4B and 4C, in the result of the disc recording surface judgment step S40, to thereby calibrate a tilt between the optical pickup unit 20 and the disc 1.

The tilt calibration step S50 includes a motor driving signal output step S52, a tilt motor operation step S54, and a turntable rotation step S56.

Figure 5:
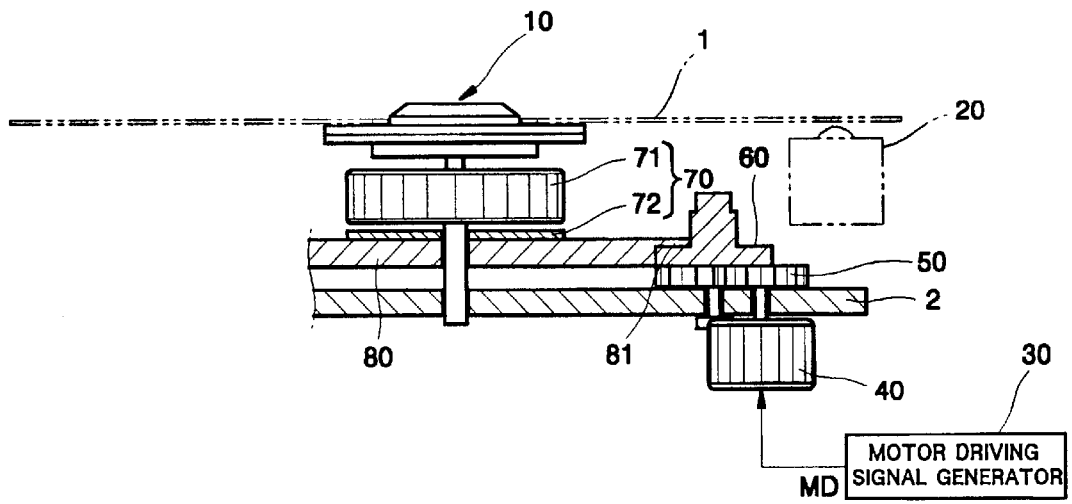
FIG. 5 is a sectional view showing a disc player for explaining a tilt calibration method for use in a disc player according to the present invention.

As shown in FIG. 5, the motor driving signal output step S52 outputs a motor driving signal MD from a motor driving signal generator 30 to a tilt motor 40, if the focus error output difference time FET is not same as the reference focus error output difference time FETrf, in the result of the disc recording surface judgment step S40. The tilt motor operation step S54 rotates the tilt motor 40 forwardly or reversely by the motor driving signal MD. In the turntable rotation step S56, an edge 81 of a regulation plate 80 integrally formed with a spindle motor 70 having a stator 72 and a rotor 71 which rotates the turntable 10, slidingly contacts a spiral slant cam 60, and thus the spiral slant cam 60 installed on the same axis as that of a cam gear 50 is rotated by the cam gear 50 driven by rotation of the tilt motor 40 in the tilt motor operation step S54, and the regulation plate 80 ascends and descends according to rotation of the spiral slant cam 60, to thereby rotate the turntable 10. A reference numeral 2 denotes a deck base to which the regulation plate 80 is supported.

For example, in the case that a disc 1a loaded onto the turntable 10 is bent upwards in comparison with the normal disc 1 as shown in FIG. 4B, since the focus error output difference time FETa in the subtraction step S30 is smaller than the preset reference focus error output difference time RFFET, a motor driving signal generator 30 outputs a motor driving signal MD for rotating a tilt motor 40 forwardly, and the tilt motor operation step S54 rotates the tilt motor 40 forwardly. Accordingly, in the turntable rotation step S56, an edge 81 of a regulation plate 80 integrally formed with a spindle motor 70 which rotates the turntable 10, slidingly contacts a spiral slant cam 60, and thus the spiral slant cam 60 is rotated by forward rotation of the tilt motor 40 in the tilt motor operation step S54, and one edge of the regulation plate 80 descends in the "D" direction, as shown in FIG. 6A, according to rotation of the spiral slant cam 60, and thus the other edge of the regulation plate 80 ascends upwards so that the spindle motor 70 and the turntable 10 are sloped to have the same angle tlt1 as the bent angle of the recording surface on the disc 1a. Thus, a tilt is calibrated so that the recording surface of the disc 1a loaded onto the turntable 10 is perpendicular to the optically axial direction. As a result, the beams irradiated from the optical pickup unit 20 are accurately perpendicular to the recording pits on the disc.

In the same manner as the above, in the case that a disc 1b loaded onto the turntable 10 is bent downwards in comparison with the normal disc 1 as shown in FIG. 4C, since the focus error output difference time FETb in the subtraction step S30 is greater than the preset reference focus error output difference time RFFET, a motor driving signal generator 30 outputs a motor driving signal MD for rotating a tilt motor 40 reversely, and the tilt motor operation step S54 rotates the tilt motor 40 reversely. Accordingly, in the turntable rotation step S56, an edge 81 of a regulation plate 80 integrally formed with a spindle motor 70 which rotates the turntable 10, slidingly contacts a spiral slant cam 60, and thus the spiral slant cam 60 is rotated by reverse rotation of the tilt motor 40 in the tilt motor operation step S54, and one edge of the regulation plate 80 descends in the "U" direction, as shown in FIG. 6B, according to rotation of the spiral slant cam 60, and thus the other edge of the regulation plate 80 descends downwards so that the spindle motor 70 and the turntable 10 are sloped to have the same angle tlt2 as the bent angle of the recording surface on the disc 1b. Thus, a tilt is calibrated so that the recording surface of the disc 1b loaded onto the turntable 10 is perpendicular to the optically axial direction, in order to irradiate the beams irradiated from the optical pickup unit 20 accurately perpendicularly onto the recording pits on the disc.

In the tilt calibration method for use in a disc player according to a first embodiment of the present invention, including a disc insertion judgment step S10, a focus error output time judgment step S20, a subtraction step S30, a disc recording surface judgment step S40, and a tilt calibration step S50, it is preferable that it is judged at least two points on a disc whether the disc is bent in which direction if the disc is loaded onto the turntable 10.

Referring to FIG. 1 the tilt calibration method in a disc player according to the first embodiment of the present invention further includes a comparison step S62 and a tilt re-calibration step S64. The comparison step S62 counts an error occurrence frequency of reproduction information read from the recording surface on the disc 1 by an error correction signal output from a digital signal processor (not shown) and compares the error occurrence frequency with a preset reference error occurrence frequency. If an error occurrence frequency is greater than the preset reference error occurrence frequency, the tilt re-calibration step S64 rotates the turntable 10 in the direction opposing the direction to which the turntable 10 was rotated in the tilt calibration step S50 so that an error correction signal does not occur in the digital signal processor, to thereby re-calibrate a tilt between the optical pickup unit 20 and the disc 1. As a result, a tilt can be accurately calibrated even in the case that a disc is twistedly bent.

Referring to FIG. 2, the operation of a tilt calibration method for use in a disc player according to a second embodiment of the present invention will follow. The disc insertion judgment step S110 judges whether or not a disc 1 has been inserted onto a turntable 10. The record signal reading step S120 reads a record signal in which an optical pickup unit 20 irradiates beams onto a recording surface on the disc 1, if a disc 1 is inserted onto the turntable 10. The RF signal output step S130 receives a record signal read by the optical pickup unit 20 in the record signal reading step S120, and outputs a RF signal filtered and shaped from the received record signal. The peak voltage comparison step S140 receives a RF signal and compares a peak voltage RFPK of the received RF signal with a preset reference peak voltage PKrf. The tilt calibration step S160 makes the turntable 10 rotate if the RF signal peak voltage RFPK is not same as the preset reference peak voltage PKrf, in the result of the peak voltage comparison step S140, to thereby calibrate a tilt between the optical pickup unit 20 and the disc 1.

Likewise, the tilt calibration step S160 includes a motor driving signal output step S162, a tilt motor operation step S164, and a turntable rotation step S166.

The motor driving signal output step S162 outputs a motor driving signal MD, if the RF signal peak voltage RFPK is not same as the preset reference peak voltage RPKV. The tilt motor operation step S164 rotates a tilt motor 40 forwardly or reversely by the motor driving signal MD. In the turntable rotation step S166, an edge 81 of a regulation plate 80 integrally formed with a spindle motor 70 which rotates the turntable 10, slidingly contacts a spiral slant cam 60, and thus the spiral slant cam 60 installed on the same axis as that of a cam gear 50 is rotated by the cam gear 50 driven by rotation of the tilt motor 40 in the tilt motor operation step S164, and the regulation plate 80 ascends and descends according to rotation of the spiral slant cam 60, to thereby rotate the turntable 10.

For example, in the case that a disc 1a loaded onto the turntable 10 is bent upwards, since the RF signal peak voltage RFPK is greater than the preset reference peak voltage PKrf, a motor driving signal generator 30 outputs a motor driving signal MD for rotating a tilt motor 40 forwardly, as shown in FIGS. 5 and 6A. Accordingly, one edge of the regulation plate 80 descends in the "D" direction, according to forward rotation of the tilt motor 40, and thus the other edge of the regulation plate 80 ascends upwards so that the spindle motor 70 and the turntable 10 are sloped to have the same angle tlt1 as the bent angle of the recording surface on the disc 1a. Thus, a tilt is calibrated so that the recording surface of the disc 1a loaded onto the turntable 10 is perpendicular to the optically axial direction. As a result, the beams irradiated from the optical pickup unit 20 are accurately perpendicular to the recording pits on the disc.

In the same manner as the above, in the case that a disc 1b loaded onto the turntable 10 is bent downwards, since the RF signal peak voltage RFPK is smaller than the preset reference peak voltage PKrf, a motor driving signal generator 30 outputs a motor driving signal MD for rotating a tilt motor 40 reversely. Accordingly, one edge of the regulation plate 80 descends in the "U" direction, according to reverse rotation of the tilt motor 40, and thus the other edge of the regulation plate 80 descends downwards so that the spindle motor 70 and the turntable 10 are sloped to have the same angle tlt2 as the bent angle of the recording surface on the disc 1b. Thus, a tilt is calibrated so that the recording surface of the disc 1b loaded onto the turntable 10 is perpendicular to the optically axial direction, in order to irradiate the beams irradiated from the optical pickup unit 20 accurately perpendicularly onto the recording pits on the disc.

Also, since the RF signal average DC voltage RFDC has a different value according to a bent degree of a disc, the tilt calibration method in a disc player according to the second embodiment of the present invention referring to FIG. 2, further includes a direct-current (DC) voltage comparison step S150. The DC voltage comparison step S150 compares an average DC voltage RFDC of the RF signal with a preset reference average DC voltage DCrf, in which the turntable 10 is made to rotate to thereby calibrate a tilt between the optical pickup unit 20 and the disc 1, if the RF signal peak voltage RFPK is not same as that of the preset reference peak voltage PKrf in the tilt calibration step S160, or the RF signal average DC voltage RFDC is smaller than the reference average DC voltage DCrf in the DC voltage comparison step S150.

In the same manner as that of the FIG. 1 embodiment, referring to FIG. 2, the tilt calibration method in a disc player according to the second embodiment of the present invention further includes a comparison step S172 and a tilt re-calibration step S174, to thereby calibrate a tilt accurately even in the case that a disc is bent upwards, downwards or twistedly.

Referring to FIG. 3, the operation of a tilt calibration method for use in a disc player according to a third embodiment of the present invention will follow. The tilt calibration method of FIG. 3 performs both that of the first embodiment of FIG. 1 and that of the second embodiment of FIG. 2. Likewise the first embodiment of FIG. 1, the tilt calibration method of FIG. 3 performs a disc insertion judgment step S210, a focus error output time judgment step S220, a subtraction step S230, a disc recording surface judgment step S240, and a first tilt calibration step S250, and thus judges whether a disc is bent in which direction to then calibrate a tilt, and thereafter performs a record signal reading step S260, a RF signal output step S270, a peak voltage comparison step S280, and a second tilt calibration step S300, and calibrates a tilt accurately even in the case that a disc is twisted. If a disc is bent severely upwards or downwards, record signals recorded on the disc cannot be read and thus an error signal occurs that the disc loaded onto a turntable cannot be reproduced and then is not driven. Thus, a tilt is primarily calibrated according to a bent degree of the disc so that the disc can be reproduced by the disc insertion judgment step S210, the focus error output time judgment step S220, the subtraction step S230, the disc recording surface judgment step S240, and the first tilt calibration step S250, which makes the disc maintained in the state where the disc can be always reproduced. Then, a tilt can be calibrated accurately even in the case that a disc is twisted by the record signal reading step S260, the RF signal output step S270, the peak voltage comparison step S280, and the second tilt calibration step S300, in the same manner as those of the second embodiment of FIG. 2.

As described above, the present invention judges a crooked state of a disc surface by a focus error output difference time or a RF signal peak voltage and thus rotates a turntable secured to a regulation plate, rotated by driving of a spindle motor and on which a disc is loaded, to thus irradiate optical beams irradiated from an optical pickup unit onto a disc surface to thereby enhance a reproduction performance.

What is claimed is:

1. A method for calibrating a tilt in a disc player, the tilt calibration method comprising:

a disc insertion judgment step of judging whether or not a disc has been inserted onto a turntable;

a focus error output time judgment step of judging a first focus error output time at which a focus error is output during ascending and a second focus error output time at which a focus error is output during descending, in which an optical pickup unit for irradiating beams onto a recording surface on the disc is made to ascend and then descend for a predetermined time, if a disc is inserted onto the turntable;

a subtraction step of subtracting the first focus error output time from the second focus error output time, both of which have been judged in the focus error output time judgment step, and outputting a focus error output difference time;

a disc recording surface judgment step of subtracting a reference focus error output difference time which is preset when the recording surface on the disc is normal from the focus error output difference time output from the subtraction step, and judging a crooked state of the recording surface on the disc; and a tilt calibration step of making the turntable rotate if the focus error output difference time is not same as the reference focus error output difference time, in the result of the disc recording surface judgment step, to thereby calibrate a tilt between the optical pickup unit and the disc.

2. The tilt calibration method of claim 1, wherein said tilt calibration step comprises:

a motor driving signal output step of outputting a motor driving signal, if the focus error output difference time is not same as the reference focus error output difference time, in the result of the disc recording surface judgment step;

a tilt motor operation step of rotating a tilt motor forwardly or reversely by the motor driving signal output from the motor driving signal output step; and a turntable rotation step of rotating the turntable, in which an edge of a regulation plate integrally formed with a spindle motor which rotates the turntable slidingly contacts a spiral slant cam, and thus the spiral slant cam installed on the same axis as that of a cam gear is rotated by the cam gear driven by rotation of the tilt motor in the tilt motor operation step, and the regulation plate ascends and descends according to rotation of the spiral slant cam.

3. The tilt calibration method of claim 1, further comprising:

a comparison step of counting an error occurrence frequency of reproduction information read from the recording surface on the disc by an error correction signal output from a digital signal processor and comparing the error occurrence frequency with a preset reference error occurrence frequency; and a tilt re-calibration step of rotating the turntable in the direction opposing the direction to which the turntable was rotated in the tilt calibration step so that an error correction signal does not occur in the digital signal processor, if an error occurrence frequency is greater than the preset reference error occurrence frequency in the comparison step, to thereby re-calibrate a tilt between the optical pickup unit and the disc.

4. A tilt calibration method for use in a disc player, comprising:

a disc insertion judgment step of judging whether or not a disc has been inserted onto a turntable;

a record signal reading step of reading a record signal in which an optical pickup unit irradiates beams onto a recording surface on the disc, if a disc is inserted onto the turntable in the disc insertion judgment step;

a RF signal output step of receiving a record signal read by the optical pickup unit in the record signal reading step, and outputting a RF signal filtered and shaped from the received record signal;

a peak voltage comparison step of receiving a RF signal and comparing a peak voltage of the received RF signal with a preset reference peak voltage;

a tilt calibration step of making the turntable rotate if the RF signal peak voltage is not same as the preset reference peak voltage, in the result of the peak voltage comparison step, to thereby calibrate a tilt between the optical pickup unit and the disc.

5. The tilt calibration method of claim 4, wherein said tilt calibration step comprises:

a motor driving signal output step of outputting a motor driving signal if the RF signal peak voltage is not same as the preset reference peak voltage, in the result of the peak voltage comparison step;

a tilt motor operation step of rotating a tilt motor forwardly or reversely by the motor driving signal output from the motor driving signal output step; and a turntable rotation step of rotating the turntable in which an edge of a regulation plate integrally formed with a spindle motor which rotates the turntable slidingly contacts a spiral slant cam, and thus the spiral slant cam installed on the same axis as that of a cam gear is rotated by the cam gear driven by rotation of the tilt motor in the tilt motor operation step, and the regulation plate ascends and descends according to rotation of the spiral slant cam.

6. The tilt calibration method of claim 4, further comprising a direct-current (DC) voltage comparison step of receiving the RF signal and comparing an average DC voltage of the received RF signal with a preset reference average DC voltage, in which the turntable is made to rotate to thereby calibrate a tilt between the optical pickup unit and the disc, if the RF signal peak voltage is not same as that of the preset reference peak voltage in the tilt calibration step, or the RF signal average DC voltage is smaller than the reference average DC voltage in the DC voltage comparison step.

7. The tilt calibration method of claim 6, wherein said tilt calibration step comprises:

a motor driving signal output step of outputting a motor driving signal if the RF signal peak voltage is not same as the preset reference peak voltage, or the RF signal average DC voltage is smaller than the reference average DC voltage;

a tilt motor operation step of rotating a tilt motor forwardly or reversely by the motor driving signal output from the motor driving signal output step; and a turntable rotation step of rotating the turntable in which an edge of a regulation plate integrally formed with a spindle motor which rotates the turntable slidingly contacts a spiral slant cam, and thus the spiral slant cam installed on the same axis as that of a cam gear is rotated by the cam gear driven by rotation of the tilt motor in the tilt motor operation step, and the regulation plate ascends and descends according to rotation of the spiral slant cam.

8. The tilt calibration method of claim 4, further comprising:

a comparison step of counting an error occurrence frequency of reproduction information read from the recording surface on the disc by an error correction signal output from a digital signal processor and comparing the error occurrence frequency with a preset reference error occurrence frequency; and a tilt re-calibration step of rotating the turntable in the direction opposing the direction to which the turntable was rotated in the tilt calibration step so that an error correction signal does not occur in the digital signal processor, if an error occurrence frequency is greater than the preset reference error occurrence frequency in the comparison step, to thereby re-calibrate a tilt between the optical pickup unit and the disc.

9. A tilt calibration method for use in a disc player comprising:

a disc insertion judgment step of judging whether or not a disc has been inserted onto a turntable;

a focus error output time judgment step of judging a first focus error output time at which a focus error is output during ascending and a second focus error output time at which a focus error is output during descending, in which an optical pickup unit for irradiating beams onto a recording surface on the disc is made to ascend and then descend for a predetermined time, if a disc is inserted onto the turntable in the disc insertion judgment step;

a subtraction step of subtracting the first focus error output time from the second focus error output time, both of which have been judged in the focus error output time judgment step, and outputting a focus error output difference time;

a disc recording surface judgment step of subtracting a reference focus error output difference time which is preset when the recording surface on the disc is normal from the focus error output difference time output from the subtraction step, and judging a crooked state of the recording surface on the disc;

a first tilt calibration step of making the turntable rotate if the focus error output difference time is not same as the reference focus error output difference time, in the result of the disc recording surface judgment step, to thereby calibrate a tilt between the optical pickup unit and the disc so that the focus error output difference time is same as the reference focus error output difference time;

a record signal reading step of reading a record signal in which an optical pickup unit irradiates beams onto a recording surface on the disc, after the first tilt calibration step;

a RF signal output step of receiving a record signal read by the optical pickup unit in the record signal reading step, and outputting a RF signal filtered and shaped from the received record signal;

a peak voltage comparison step of receiving a RF signal and compares a peak voltage of the received RF signal with a preset reference peak voltage; and a second tilt calibration step of making the turntable rotate if the RF signal peak voltage is not same as the preset reference peak voltage, in the result of the peak voltage comparison step, to thereby calibrate a tilt between the optical pickup unit and the disc so that the RF signal peak voltage is same as the preset reference peak voltage.

10. The tilt calibration method of claim 9, wherein said first tilt calibration step comprises:

a motor driving signal output step of outputting a motor driving signal, if the focus error output difference time is not same as the reference focus error output difference time, in the result of the disc recording surface judgment step;

a tilt motor operation step of rotating a tilt motor forwardly or reversely by the motor driving signal output from the motor driving signal output step; and a turntable rotation step of rotating the turntable, in which an edge of a regulation plate integrally formed with a spindle motor which rotates the turntable slidingly contacts a spiral slant cam, and thus the spiral slant cam installed on the same axis as that of a cam gear is rotated by the cam gear driven by rotation of the tilt motor in the tilt motor operation step, and the regulation plate ascends and descends according to rotation of the spiral slant cam.

11. The tilt calibration method of claim 9, wherein said second tilt calibration step comprises:

a motor driving signal output step of outputting a motor driving signal if the RF signal peak voltage is not same as the preset reference peak voltage, in the peak voltage comparison step;

a tilt motor operation step of rotating a tilt motor forwardly or reversely by the motor driving signal output from the motor driving signal output step; and a turntable rotation step of rotating the turntable in which an edge of a regulation plate integrally formed with a spindle motor which rotates the turntable slidingly contacts a spiral slant cam, and thus the spiral slant cam installed on the same axis as that of a cam gear is rotated by the cam gear driven by rotation of the tilt motor in the tilt motor operation step, and the regulation plate ascends and descends according to rotation of the spiral slant cam.

12. The tilt calibration method of claim 9, further comprising a direct-current (DC) voltage comparison step of receiving the RF signal and comparing an average DC voltage of the received RF signal with a preset reference average DC voltage, in which the turntable is made to rotate to thereby calibrate a tilt between the optical pickup unit and the disc, if the RF signal peak voltage is not same as that of the preset reference peak voltage in the second tilt calibration step, or the RF signal average DC voltage is smaller than the reference average DC voltage in the DC voltage comparison step.

13. The tilt calibration method of claim 12, wherein said second tilt calibration step comprises:

a motor driving signal output step of outputting a motor driving signal if the RF signal peak voltage is not same as the preset reference peak voltage, or the RF signal average DC voltage is smaller than the reference average DC voltage;

a tilt motor operation step of rotating a tilt motor forwardly or reversely by the motor driving signal output from the motor driving signal output step; and a turntable rotation step of rotating the turntable in which an edge of a regulation plate integrally formed with a spindle motor which rotates the turntable slidingly contacts a spiral slant cam, and thus the spiral slant cam installed on the same axis as that of a cam gear is rotated by the cam gear driven by rotation of the tilt motor in the tilt motor operation step, and the regulation plate ascends and descends according to rotation of the spiral slant cam.

14. The tilt calibration method of claim 9, further comprising:

a comparison step of counting an error occurrence frequency of reproduction information read from the recording surface on the disc by an error correction signal output from a digital signal processor and comparing the error occurrence frequency with a preset reference error occurrence frequency; and a tilt re-calibration step of rotating the turntable in the direction opposing the direction to which the turntable was rotated in the second tilt calibration step so that an error correction signal does not occur in the digital signal processor, if an error occurrence frequency is greater than the preset reference error occurrence frequency in the comparison step, the to thereby re-calibrate a tilt between the optical pickup unit and the disc.

* * * * *